United States Patent
Hillard et al.

(10) Patent No.: US 11,960,007 B2
(45) Date of Patent: Apr. 16, 2024

(54) LIDAR SYSTEM AND METHOD OF OPERATION

(71) Applicant: Red Leader Technologies, Inc., Palo Alto, CA (US)

(72) Inventors: Jacob Hillard, Palo Alto, CA (US); Rebecca Wong, Palo Alto, CA (US); Jhoneldrick Millares, Palo Alto, CA (US); Logan Herrera, Palo Alto, CA (US)

(73) Assignee: Red Leader Technologies, Inc., Mountain View, CA (US)

( * ) Notice: Subject to any disclaimer, the term of this patent is extended or adjusted under 35 U.S.C. 154(b) by 0 days.

(21) Appl. No.: 17/946,844

(22) Filed: Sep. 16, 2022

(65) Prior Publication Data
US 2023/0019906 A1 Jan. 19, 2023

Related U.S. Application Data

(63) Continuation of application No. 16/663,249, filed on Oct. 24, 2019, now Pat. No. 11,579,301.
(Continued)

(51) Int. Cl.
*G01S 17/89* (2020.01)
*G01S 7/48* (2006.01)
(Continued)

(52) U.S. Cl.
CPC .......... *G01S 17/89* (2013.01); *G01S 7/4804* (2013.01); *G01S 7/4815* (2013.01); *G01S 7/4816* (2013.01); *G01S 7/4817* (2013.01); *G01S 7/4865* (2013.01); *G01S 7/4911* (2013.01); *G01S 7/4914* (2013.01); *G01S 17/26* (2020.01)

(58) Field of Classification Search
CPC .... G01S 7/4865; G01S 7/4815; G01S 7/4816; G01S 7/4817; G01S 7/4804; G01S 7/493; G01S 17/89; G01S 7/4914; G01S 7/4911; G01S 17/26
See application file for complete search history.

(56) References Cited

U.S. PATENT DOCUMENTS

| | | |
|---|---|---|
| 5,532,697 A | 7/1996 | Hidaka et al. |
| 6,031,601 A | 2/2000 | Mccusker et al. |
| (Continued) | | |

FOREIGN PATENT DOCUMENTS

| | | |
|---|---|---|
| CN | 103616696 A | 3/2014 |
| CN | 111474553 A | 7/2020 |
| (Continued) | | |

OTHER PUBLICATIONS

Ke, Pinhui, et al., "A Generic Constructions of Z-Periodic Complementary Sequence Sets with Flexible Flock Size and Zero Correlation Zone Length", IEEE Signal Processing Letters, vol. 22, No. 9, Sep. 2015.
(Continued)

*Primary Examiner* — Neil R Mikeska
(74) *Attorney, Agent, or Firm* — Jeffrey Schox; Samuel Rosenthal

(57) ABSTRACT

A lidar system, preferably including one or more transmit modules, beam directors, and/or receive modules, and optionally including one or more processing modules. A method of lidar system operation, preferably including: emitting light beams, receiving reflected light beams, and/or analyzing data associated with the received light beams.

8 Claims, 13 Drawing Sheets

Related U.S. Application Data

(60) Provisional application No. 62/750,058, filed on Oct. 24, 2018, provisional application No. 62/749,795, filed on Oct. 24, 2018.

(51) Int. Cl.
  *G01S 7/481* (2006.01)
  *G01S 7/4865* (2020.01)
  *G01S 7/4911* (2020.01)
  *G01S 7/4914* (2020.01)
  *G01S 17/26* (2020.01)

(56) References Cited

U.S. PATENT DOCUMENTS

| | | |
|---|---|---|
| 7,532,311 B2 | 5/2009 | Henderson et al. |
| 7,642,963 B2 | 1/2010 | Apostolos et al. |
| 8,072,582 B2 | 12/2011 | Meneely |
| 8,605,261 B2 | 12/2013 | Rindle |
| 9,097,646 B1 | 8/2015 | Campbell et al. |
| 9,684,076 B1 | 6/2017 | Feldkhun |
| 9,759,810 B1 | 9/2017 | Sankar |
| 10,267,898 B2 | 4/2019 | Campbell et al. |
| 10,488,492 B2 | 11/2019 | Hamel et al. |
| 10,527,727 B2 | 1/2020 | Bondy et al. |
| 10,591,604 B2 | 3/2020 | Xu |
| 10,845,470 B2 | 11/2020 | Verghese et al. |
| 10,928,485 B1 | 2/2021 | Karadeniz et al. |
| 10,969,475 B2 | 4/2021 | Li et al. |
| 11,054,508 B2 | 7/2021 | Li et al. |
| 11,204,420 B2 | 12/2021 | Kubota et al. |
| 2004/0105087 A1 | 6/2004 | Gogolla et al. |
| 2006/0227317 A1 | 10/2006 | Henderson et al. |
| 2009/0195454 A1 | 8/2009 | Apostolos et al. |
| 2010/0045965 A1 | 2/2010 | Meneely |
| 2011/0255070 A1 | 10/2011 | Phillips et al. |
| 2012/0281200 A1 | 11/2012 | Rindle |
| 2013/0116977 A1 | 5/2013 | Godbaz et al. |
| 2013/0258312 A1 | 10/2013 | Lewis |
| 2016/0154104 A1 | 6/2016 | Schumann et al. |
| 2016/0259038 A1 | 9/2016 | Retterath et al. |
| 2016/0266246 A1 | 9/2016 | Hjelmstad |
| 2016/0327637 A1 | 11/2016 | Gazit et al. |
| 2017/0307726 A1 | 10/2017 | Mazzaro et al. |
| 2018/0188358 A1 | 7/2018 | Li et al. |
| 2018/0188368 A1 | 7/2018 | Zuffada et al. |
| 2018/0224535 A1 | 8/2018 | Sankar |
| 2018/0259645 A1 | 9/2018 | Shu et al. |
| 2018/0267169 A1 | 9/2018 | Xu |
| 2018/0275249 A1 | 9/2018 | Campbell et al. |
| 2018/0275252 A1 | 9/2018 | Fried et al. |
| 2018/0292534 A1 | 10/2018 | Field |
| 2018/0299554 A1 | 10/2018 | Van Dyck et al. |
| 2018/0373260 A1 | 12/2018 | Lipson et al. |
| 2019/0011541 A1 | 1/2019 | O'Keeffe |
| 2019/0056497 A1 | 2/2019 | Pacala et al. |
| 2019/0086531 A1 | 3/2019 | Rick |
| 2019/0120939 A1 | 4/2019 | O'Keeffe |
| 2019/0179018 A1 | 6/2019 | Gunnam et al. |
| 2019/0353787 A1 | 11/2019 | Petit |
| 2020/0132847 A1 | 4/2020 | Hillard et al. |
| 2020/0132848 A1 | 4/2020 | Hillard et al. |
| 2021/0072381 A1 | 3/2021 | Crouch et al. |
| 2021/0156970 A1 | 5/2021 | Baier et al. |

FOREIGN PATENT DOCUMENTS

| | | |
|---|---|---|
| CN | 106443707 B | 10/2023 |
| DE | 102012112985 B3 | 12/2013 |
| DE | 102016222138 A1 | 5/2018 |
| JP | 2003130944 A | 5/2003 |
| JP | 2018009829 A | 1/2018 |
| WO | 2010040924 A1 | 4/2010 |
| WO | 2018050906 A2 | 3/2018 |
| WO | 2020086903 A1 | 4/2020 |
| WO | 2020086906 A1 | 4/2020 |

OTHER PUBLICATIONS

Liu, Zilong, et al., "Correlation and Set Size Bounds of Complementary Sequences with Low Correlation Zone", IEEE Transactions on Communications, Dec. 2011.

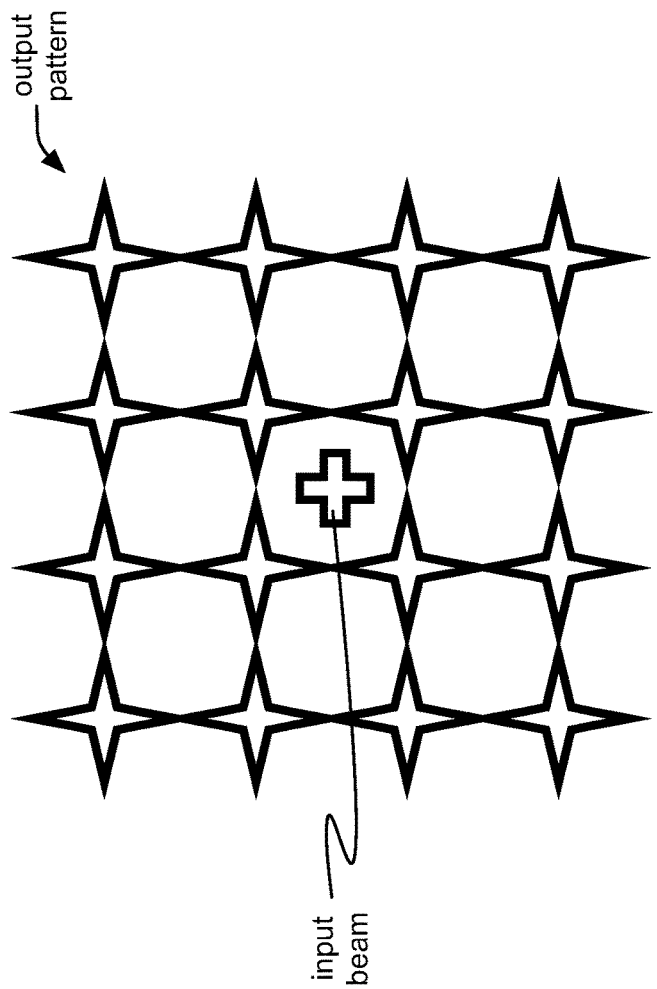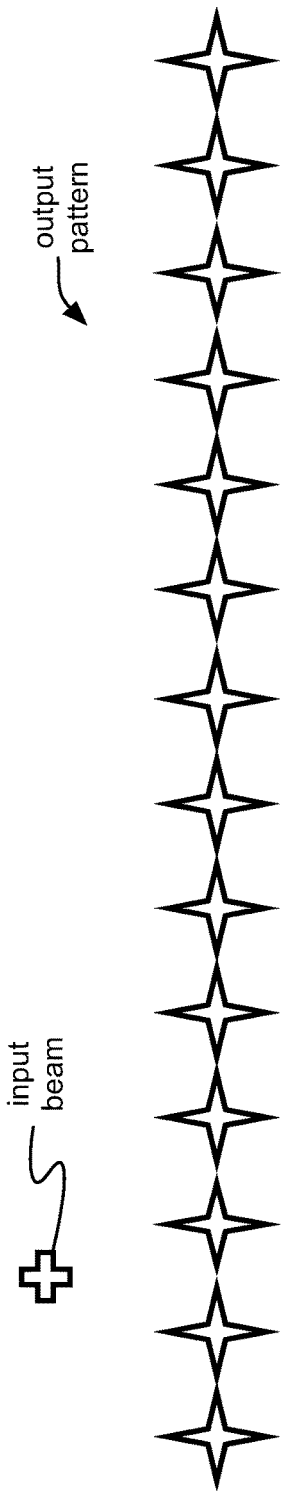

LIDAR SYSTEM AND METHOD OF OPERATION

CROSS-REFERENCE TO RELATED APPLICATIONS

This application is a continuation of U.S. patent application Ser. No. 16/663,249, filed on 24 Oct. 2019, which claims the benefit of U.S. Provisional Application Ser. No. 62/749,795, filed on 24 Oct. 2018, and of U.S. Provisional Application Ser. No. 62/750,058, filed on 24 Oct. 2018, each of which is incorporated in its entirety by this reference.

TECHNICAL FIELD

This invention relates generally to the object detection field, and more specifically to a new and useful lidar system and method of operation in the object detection field.

BACKGROUND

Typical lidar systems and methods are limited to a single beam of light per emitter and/or detector. As such, it may be impractical for such systems and methods to employ more than a few beams of light, thereby limiting their performance. Thus, there is a need in the object detection field to create a new and useful lidar system and method of operation.

BRIEF DESCRIPTION OF THE FIGURES

FIGS. 6A-6B are representations of output patterns associated with a beamsplitter of the first and second example, respectively, of the lidar system.

DESCRIPTION OF THE PREFERRED EMBODIMENTS

Figure 1A:
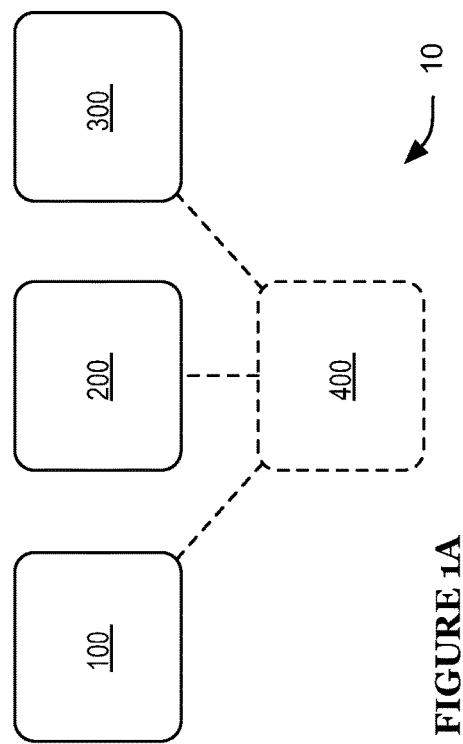
FIG. 1A is a schematic representation of an embodiment of the lidar system.
Figure 1B:
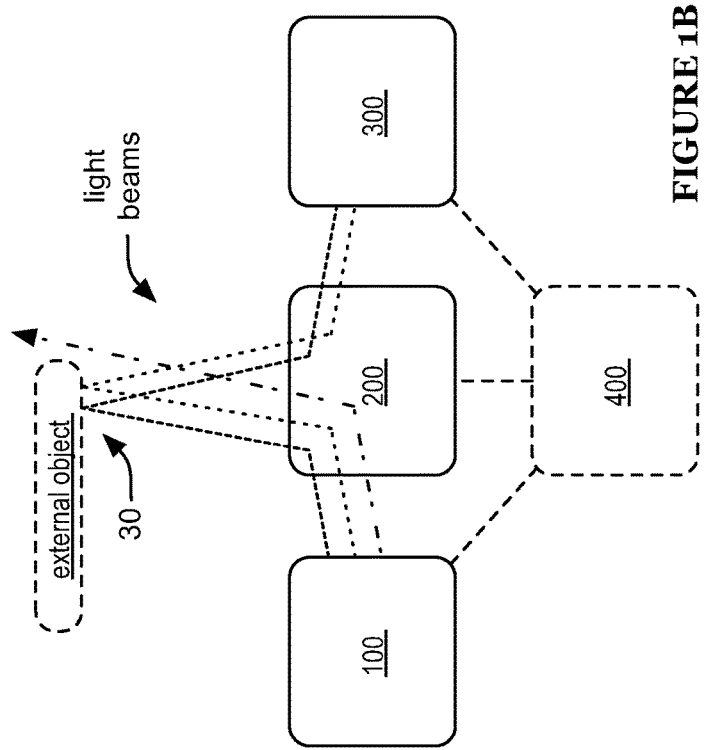
FIG. 1B is a schematic representation of the embodiment of the lidar system in use.

The following description of the preferred embodiments of the invention is not intended to limit the invention to these preferred embodiments, but rather to enable any person skilled in the art to make and use this invention.

1. Overview

The lidar system 10 preferably includes one or more transmit modules 100, beam directors 200, and/or receive modules 300, and optionally includes one or more processing modules 400 (e.g., as shown in FIGS. 1A-1B and 3A-3B). However, the system 10 can additionally or alternatively include any other suitable elements in any suitable arrangement.

Figure 2:
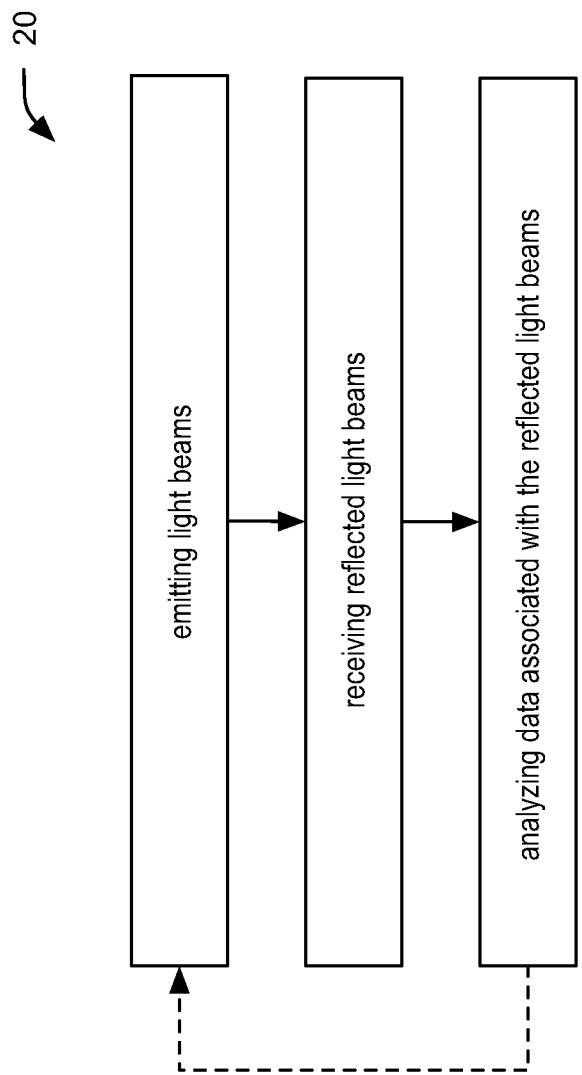
FIG. 2 is a flowchart representations of an embodiment of the method.

A method 20 of lidar system operation preferably includes emitting light beams, receiving reflected light beams, and/or analyzing data associated with the received light beams (e.g., as shown in FIG. 2). However, the method can additionally or alternatively include any other suitable elements performed in any suitable manner. The method 20 is preferably performed using the lidar system 10, but can additionally or alternatively be performed using any other suitable system(s).

2. System

2.1 Transmit Module

The transmit module 100 preferably functions to transmit one or more light beams (e.g., for use in lidar-based object detection). The transmit module 100 preferably includes a transmitter 110 (more preferably, a plurality of transmitters 110), and optionally includes transmit module optics 120.

Each transmitter 110 preferably includes an optical emitter 111 and a controller 112, and can additionally or alternatively include transmitter optics 113 and/or any other suitable transmitter elements.

The optical emitter 111 preferably functions to (e.g., is operable to) emit one or more optical signals. The optical signals are preferably beam-like (e.g., laser beams), but can additionally or alternatively have any other suitable optical characteristics. The optical emitter preferably includes a laser (e.g., diode laser), but can additionally or alternatively include any other suitable elements. The laser is preferably a continuous wave laser (e.g., operable and/or configured to emit substantially continuous wave radiation) but can additionally or alternatively include a pulsed laser (e.g., operable and/or configured to emit pulses of radiation) and/or any other suitable laser. In one specific example, the laser emits light with a wavelength of substantially 900 nm (e.g., 890-910 nm). In a second specific example, the laser emits light with a wavelength of substantially 1550 nm (e.g., 1540-1560 nm). However, the laser can additionally or alternatively include any other suitable lasers.

The controller 112 preferably functions to control the optical emitter 111 (e.g., control characteristics of light emitted by the optical emitter 111). The controller 112 is preferably communicatively coupled to the processing module 400 (e.g., wherein the processing module 400 is configured to control operation of the controller 112). In one embodiment, the controller 112 includes a digital-to-analog converter (DAC) configured to control a laser driver of the optical emitter based on digital commands (e.g., received from the processing module 400).

The controller 112 preferably includes one or more modulators. Additionally or alternatively, the transmitter 110 can include one or more modulators separate from the controller 112 (e.g., integrated with the optical emitter 111, distinct from the optical emitter 111, etc.) and/or any other suitable modulators (or include no modulator). Each modulator is preferably operable to modulate one or more aspects (e.g., phase, intensity, wavelength, etc.) of the light emitted by the optical emitter 111 (e.g., control the emitter to modulate the light output, such as by modulating a laser control signal; directly modulate the light, such as after emission from the emitter; etc.).

The transmitter optics 113 can function to couple light from the optical emitter 111 into the transmit module optics 120. The transmitter optics 113 can include refractive elements, reflective elements, diffractive elements, and/or any other suitable optical elements. However, the transmitter 110 can alternatively include no transmitter optics 113 (e.g., wherein light from the optical emitter 111 is coupled directly to the transmit module optics 120).

The transmit module optics 120 preferably function to control the relative spatial arrangement of light beams output by the transmit module 100. The transmit module optics 120 preferably include a beam splitter 121 (or multiple beam splitters), and can additionally or alternatively include one or more lenses 122 and/or any other suitable optical elements.

The beam splitter 121 preferably functions to split each incident light beam (e.g., received from the transmitters 110) into multiple beams. The beam splitter 121 preferably includes a diffractive beam splitter (or multiple diffractive beam splitters), but can additionally or alternatively include one or more reflective beam splitters (e.g., that each split each incident beam into 2 output beams) and/or any other suitable beam splitters. The number of output beams that result from each beam incident on the beam splitter (e.g., the multiplicity of the beam splitter) is preferably greater than 2 (e.g., the beam splitter 121 splits each incident beam into 4, 8, 16, 32, 64, 128, 3-10, 10-30, 30-100, or 100-300 output beams, etc.), but can alternatively be 2 or and/or any other suitable number. The beam splitter 121 preferably splits each incident beam into a regular array of output beams, but can alternatively split the incident beams into any other suitable pattern of output beams. In a first example, the beam splitter 121 splits each incident beam into a two-dimensional lattice of output beams (e.g., square lattice, hexagonal lattice, rectangular lattice, rhombic lattice, parallelogrammic lattice), such as a 4×4 lattice, 2×8 lattice, 4×8 lattice, or any other suitable lattice (e.g., 4×4 square lattice, such as shown in FIG. 6A). In a second example, the beam splitter 121 splits each incident beam into a line of output beams (e.g., a 16×1 linear array, such as shown in FIG. 6B). However, the beam splitter 121 can additionally or alternatively create any other suitable pattern of output beams.

The lens(es) 122 preferably function to direct light (e.g., from the transmitters) into the beam splitter 121 (e.g., into desired input locations of the beam splitter) and/or to control the divergence angle of beams output from the beam splitter 121. In some examples, the lenses 122 include a collimator 122a arranged between (e.g., along an optical path) the transmitter 110 and the beam splitter 121, and a convergent lens 122b opposing the collimator across the beam splitter (e.g., between the beam splitter and the beam director). However, the lenses 122 can additionally or alternatively include any other suitable lenses in any suitable arrangement. Although referred to as lenses, a person of skill in the art will recognize that the lenses 122 can include any suitable refractive, reflective and/or diffractive elements, and/or any other suitable optical elements of any kind.

The transmit module 100 preferably includes multiple transmitters 110 (e.g., 2, 4, 8, 16, 32, 64, 128, 2-5, 5-10, 10-20, 20-50, 50-100, 100-200, or 200-500 transmitters), but can alternatively include only a single transmitter 110. In embodiments in which the transmit module 100 includes multiple transmitters, the transmitters are preferably arranged (e.g., defining an emitter array) such that the light beams they emit define sub-pixels (e.g., wherein each transmitter is associated with a single sub-pixel). The sub-pixels preferably define a grid (e.g., square, rectangular, hexagonal, etc.) or line arrangement, but can additionally or alternatively define any other suitable ordered (e.g., regular, crystalline, quasi-crystalline, etc.) or disordered arrangements (e.g., defined on a reference plane intersecting the light beams, such as a plane substantially parallel the beam splitter 121 and/or substantially normal to a light beam propagation direction; defined within space; etc.).

Figure 4:
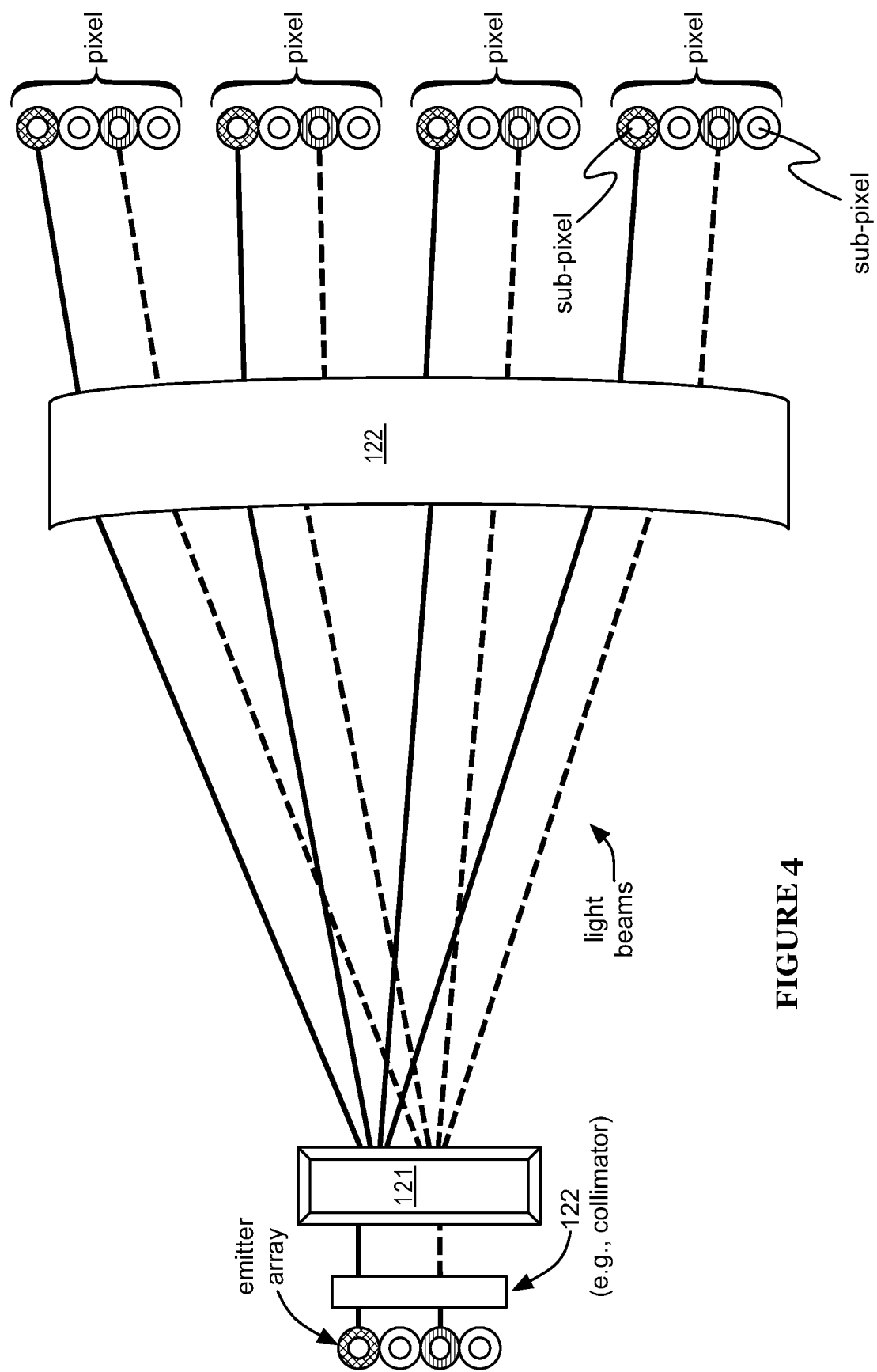
FIG. 4 is a side view of an example of emitted beam paths in the lidar system.
Figure 5A:
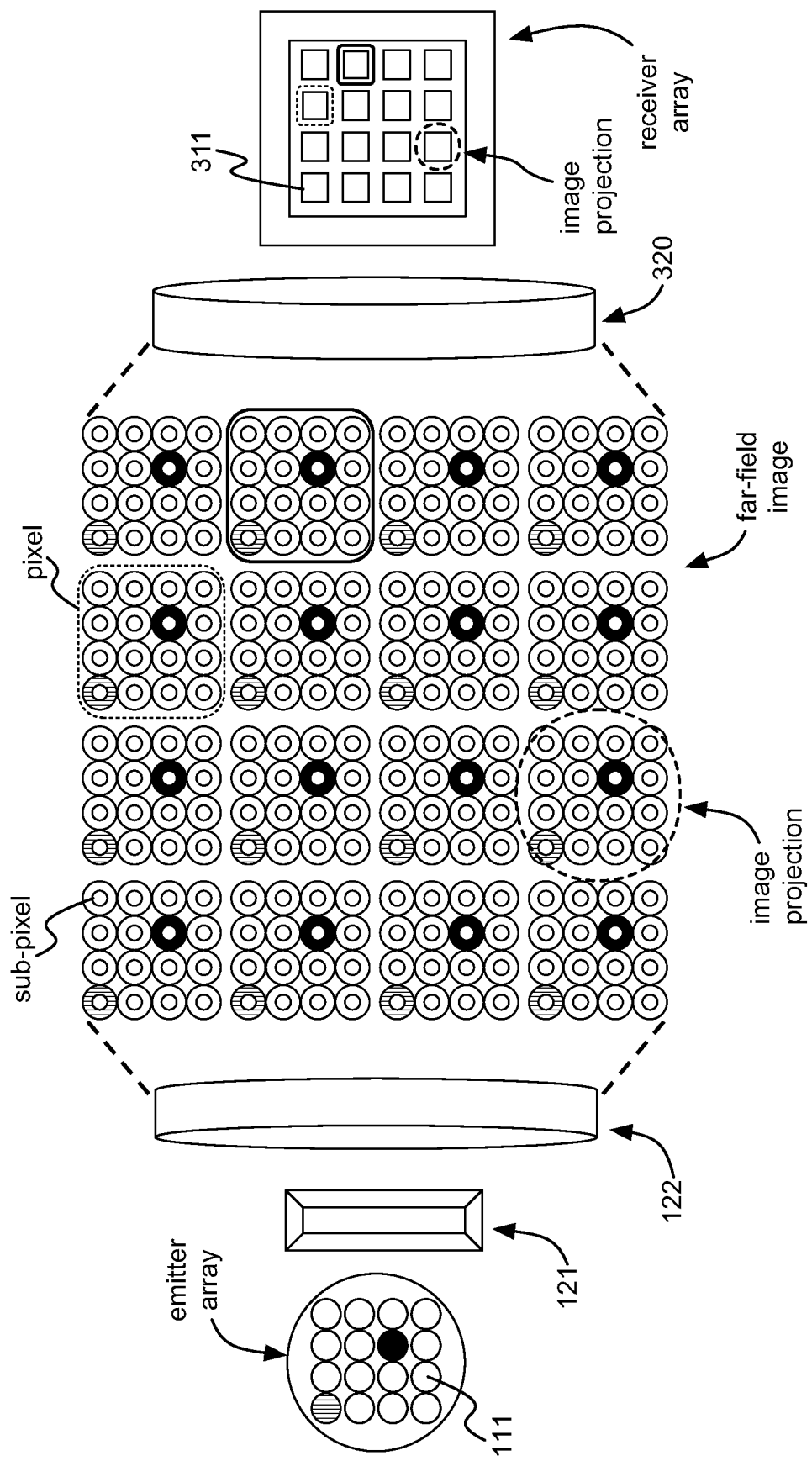
FIGS. 5A-5B are representations of a first and second example, respectively, of the lidar system.
Figure 5B:
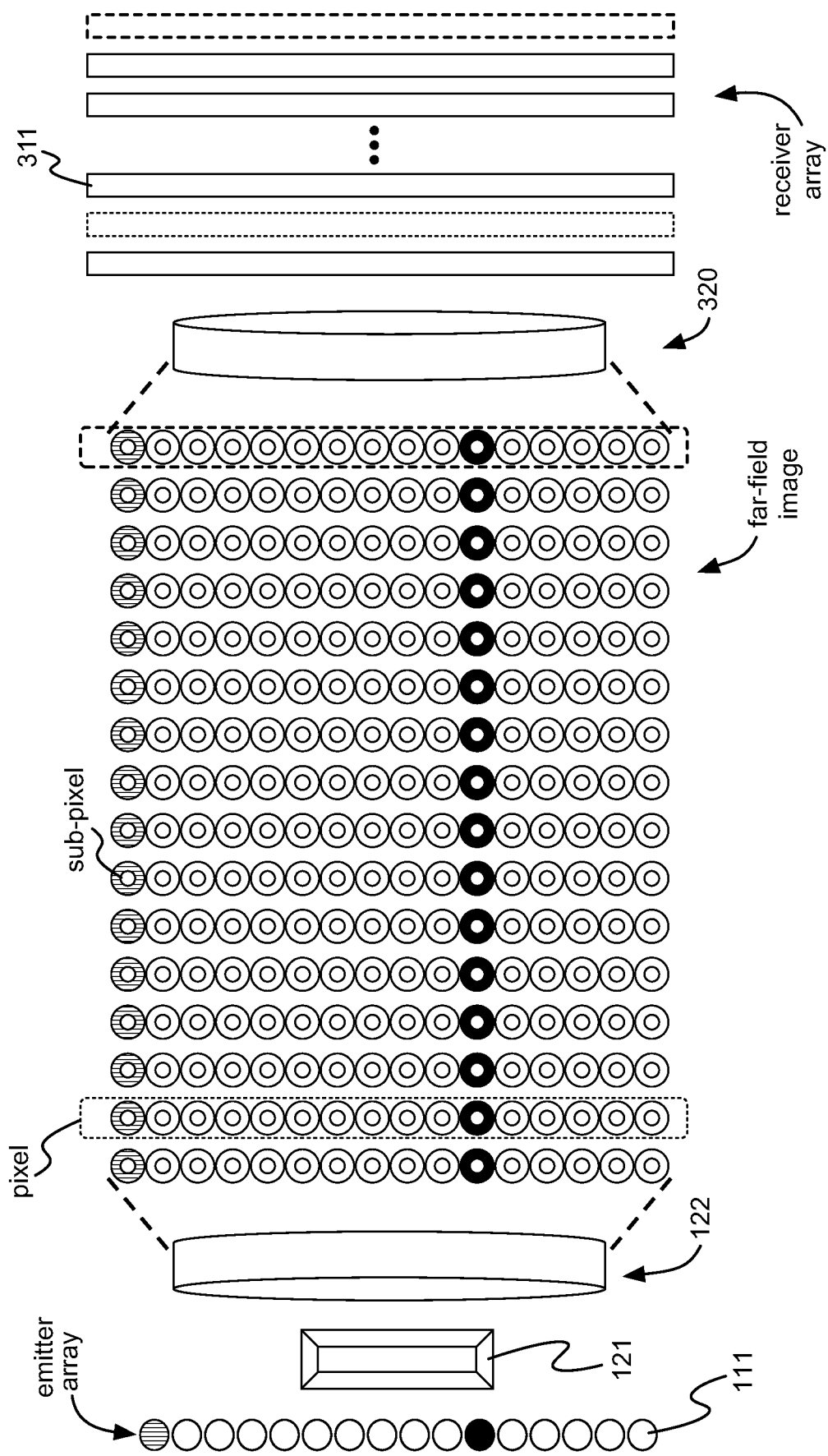

The beam splitter 120 preferably defines pixels, wherein each pixel preferably includes a plurality of sub-pixels (e.g., light beams). The beam splitter 121 preferably splits each transmitter's beam into a plurality of beams (but can alternatively split only the beams of a subset of the transmitters), wherein each of the split beams defines a sub-pixel of a different pixel. All pixels preferably have the same number of sub-pixels in the same arrangement. All split beams originating from a single transmitter's beam preferably correspond to the same sub-pixel within their respective pixel (e.g., as shown in FIGS. 4, 5A, and 5B). The number of sub-pixels per pixel can be less than, equal to, or greater than the total number of pixels.

Preferably, the spacing (e.g., angular spacing, such as for divergent beams; lateral spacing, such as for parallel beams and/or substantially parallel beams; etc.) between adjacent sub-pixels within a single pixel (the sub-pixel gap) is less than the spacing between adjacent sub-pixels of different pixels (the pixel gap), which can, for example, facilitate pixel alignment with the optical transducers. However, the sub-pixel gap can additionally or alternatively be substantially equal to, greater than, and/or any other suitable amount relative to the pixel gap. The pixel gap and sub-pixel gap are each preferably greater than a safety and/or regulatory limit for consideration as independent beams (e.g., 1.5 mrad), but can alternatively be less than such a limit (e.g., wherein the total power of multiple beams, such as all beams of a pixel, may be considered for beam limits such as eye exposure safety limits).

In a first example, the beam splitter 121 defines a substantially square grid of pixels (e.g., 4×4 pixel array), and the transmitters 110 define a substantially square grid of sub-pixels within each pixel (e.g., 4×4 sub-pixel array forming each pixel). In this example, the pixel and sub-pixel grids are preferably substantially aligned (e.g., defined along substantially parallel directions, such as shown in FIG. 5A), but can additionally or alternatively have any other suitable relative arrangement (e.g., defined along directions separated by an oblique angle). FIG. 5A depicts a specific example of this example. In this depiction, a first emitter and all of the sub-pixel beams emitted by the first emitter (shown in the far-field image of the emitted beam pattern) are color coded blue, and a second emitter and all of the sub-pixel beams emitted by the second emitter are color coded red. Further, a first receiver and the pixel that it receives (shown in the far-field image of the emitted beam pattern) are color coded orange, and a second receiver and the pixel that it receives are color coded pink. FIG. 5A further depicts an image projection corresponding to the beams of a third pixel in both the far-field image and at the receiver upon which it is incident.

In a second example, the beam splitter 121 defines a substantially linear array of pixels (e.g., 16×1 pixel array), and the transmitters no define a substantially linear array of sub-pixels within each pixel (e.g., 1×16 sub-pixel array forming each pixel). In this example, the pixel and sub-pixel grids are preferably substantially orthogonal (e.g., defined along substantially orthogonal directions, such as shown in FIG. 5B), but can additionally or alternatively have any other suitable relative arrangement (e.g., defined along directions separated by an oblique angle, defined along substantially parallel directions, etc.). FIG. 5B depicts a specific example of this example. In this depiction, a first emitter and all of the sub-pixel beams emitted by the first emitter (shown in the far-field image of the emitted beam pattern) are color coded blue, and a second emitter and all of the sub-pixel beams emitted by the second emitter are color coded red. Further, a first receiver and the pixel that it receives (shown in the far-field image of the emitted beam pattern) are color coded orange, and a second receiver and the pixel that it receives are color coded green.

However, the transmit module 100 can additionally or alternatively include any other suitable elements in any suitable arrangement.

2.2 Beam Director

Figure 9:
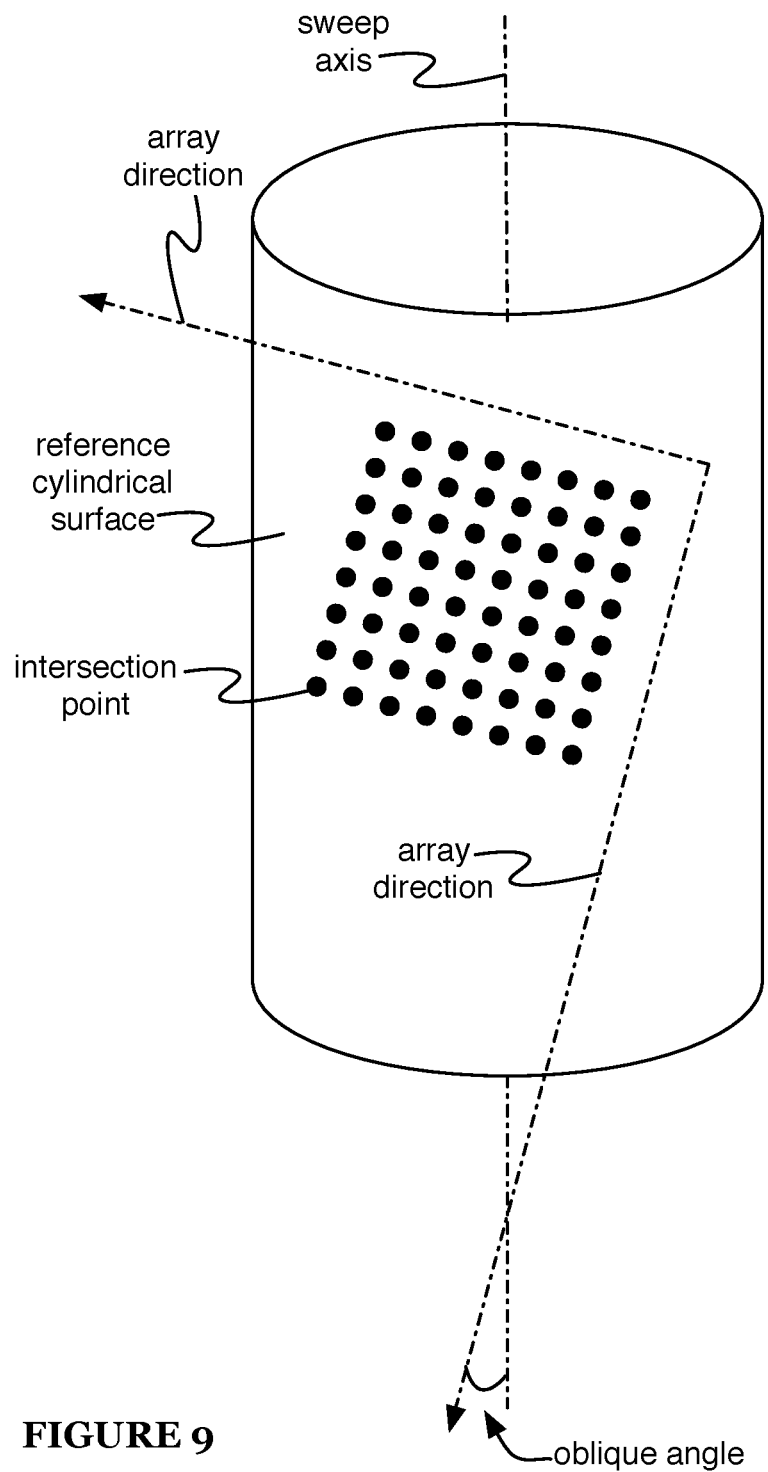
FIG. 9 is a representation of intersections of a beam pattern with a reference surface.

The beam director(s) 200 preferably functions to direct the light beams between aspects of the system 200 and the external environment. For example, a beam director 200 can direct each emitted light beam (or a subset thereof) from the transmit module 100 (e.g., from a transmitter 110 and/or beam splitter 121 of the transmit module 100) to an external location 30, wherein the beam reflects off the external location 30 (and/or other external locations). The beam director preferably directs each beam (or a subset thereof) outward of a common axis (e.g., beam director axis, such as described below in more detail, vertical axis, etc.) and/or a common point (e.g., origin). Each beam preferably defines a respective polar angle between the beam and the common axis and/or a respective azimuthal angle within a reference plane normal to the common axis. The reference plane can be a shared reference plane (e.g., plane including the common point) or can be defined separately for each beam (e.g., plane including an intersection point between the common axis and a line collinear with the respective beam). The beam director preferably defines one or more reference surfaces (e.g., geometrical references defined relative to the propagation of the beams and/or other features of the beam director and/or the system, rather than tangible surfaces), more preferably one or more reference cylindrical surfaces, such as cylindrical surfaces coaxial with the common axis. The beam director preferably directs the beams to intersect one or more of the reference surfaces (e.g., as shown in FIG. 9). The intersection points on a reference surface can define (or substantially define) one or more arrays (e.g., linear arrays defined along an array direction, rectangular arrays defined along a pair of array directions preferably orthogonal to each other, hexagonal arrays defined along a set of three array directions preferably at 60° angles to each other, etc.), preferably regular arrays but additionally or alternatively arrays with any other suitable spacing. As the arrays can be defined on one or more non-planar reference surfaces, a person of skill in the art will recognize that the array directions are not necessarily linear, but rather may include one or more curves defined on the respective reference surface. The array directions are preferably arranged at oblique angles (e.g., substantially oblique angles) to one or more reference lines parallel the sweep axis and/or to the direction(s) of motion (e.g., as described below), but can additionally or alternatively be arranged substantially parallel and/or perpendicular such lines and/or directions, and/or have any other suitable arrangement.

Figure 3A:
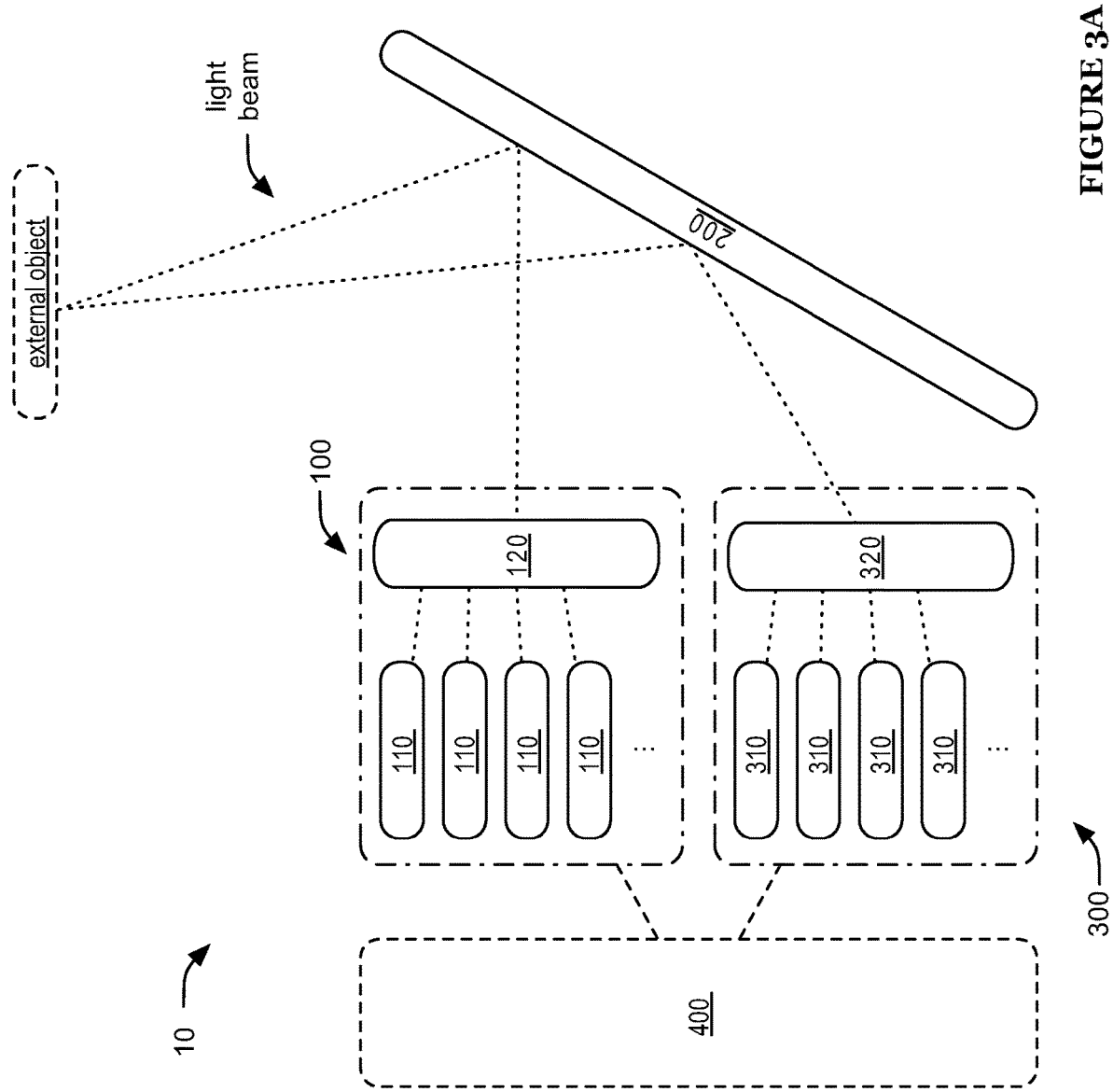
FIGS. 3A-3B are schematic representations of a variation of the lidar system and of a specific example of the variation, respectively.
Figure 3B:
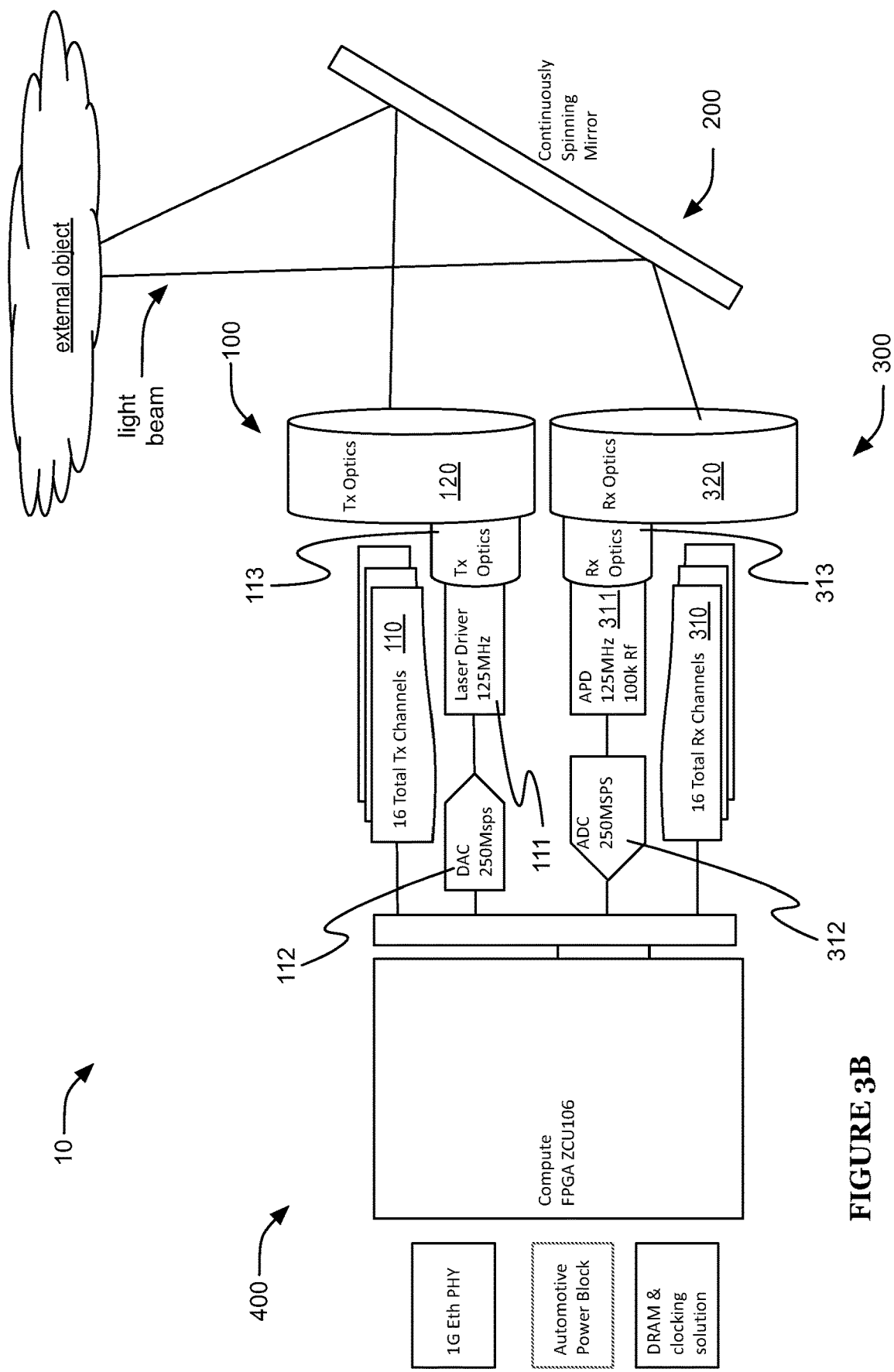

Each emitted beam is preferably directed to a different external location 30 within the external environment, more preferably wherein the relative arrangement of the individual beams is substantially preserved (e.g., the beams in the external environment define a substantially geometrically similar pattern as the beams prior to entering the beam director 200). For some or all of the beams, the beam is preferably reflected back to the beam director 200, which directs the reflected beam to the receive module 300 (e.g., to a receiver 310 of the receive module). However, the beam can additionally or alternatively be reflected to another beam director 200 (e.g., which directs the signal to the receive module 300), to the receive module 300 (e.g., directly), and/or to any other suitable element(s) of the lidar system 10. Each beam director 200 can direct one or more emitted beams and one or more reflected beams, and can direct the beams between one or more transmitters 110, external locations 30, and/or receivers 310 (e.g., as shown in FIG. 3A-3B).

The beam director 200 is preferably configured to direct the beams to different external locations 30 (e.g., along different beam propagation directions) over time. Preferably, the beam director 200 sweeps the beams along a single sweep direction (e.g., direction in which the beam propagation direction changes, such as the time derivative of a beam propagation vector). The sweep direction is preferably substantially the same for all the beams. In one example, the beam director 200 includes an element (e.g., mirror) configured to rotate (e.g., continuous rotation in a single direction, oscillating back-and-forth, etc.) about a beam director axis (e.g., sweep axis). In this example, rotation of this element sweeps the beams (e.g., sweeping out substantially parallel planar regions; sweeping out substantially coaxial right conical regions, such as substantially coaxial with the beam director axis; etc.). In a specific example, the beam director axis is substantially vertical (e.g., parallel a gravity vector; orthogonal to a support surface, such as the ground or another surface on which the lidar system 10 is supported; etc.). However, the beam director axis can additionally or alternatively have any other suitable orientation. In some embodiments, each beam exiting the beam director (or a subset of such beams) sweeps out a region of a substantially conical surface, preferably wherein the conical surfaces are substantially right conical surfaces and/or are substantially coaxial (e.g., about the sweep axis), more preferably wherein the conical surface apexes are at substantially the same point (e.g., the common point described above). In other embodiments (e.g., in which the polar angles are substantially) 90°, each beam exiting the beam director (or a subset of such beams) sweeps out a substantially planar region, preferably wherein the planar regions swept out by the beams are substantially parallel.

Figure 7A:
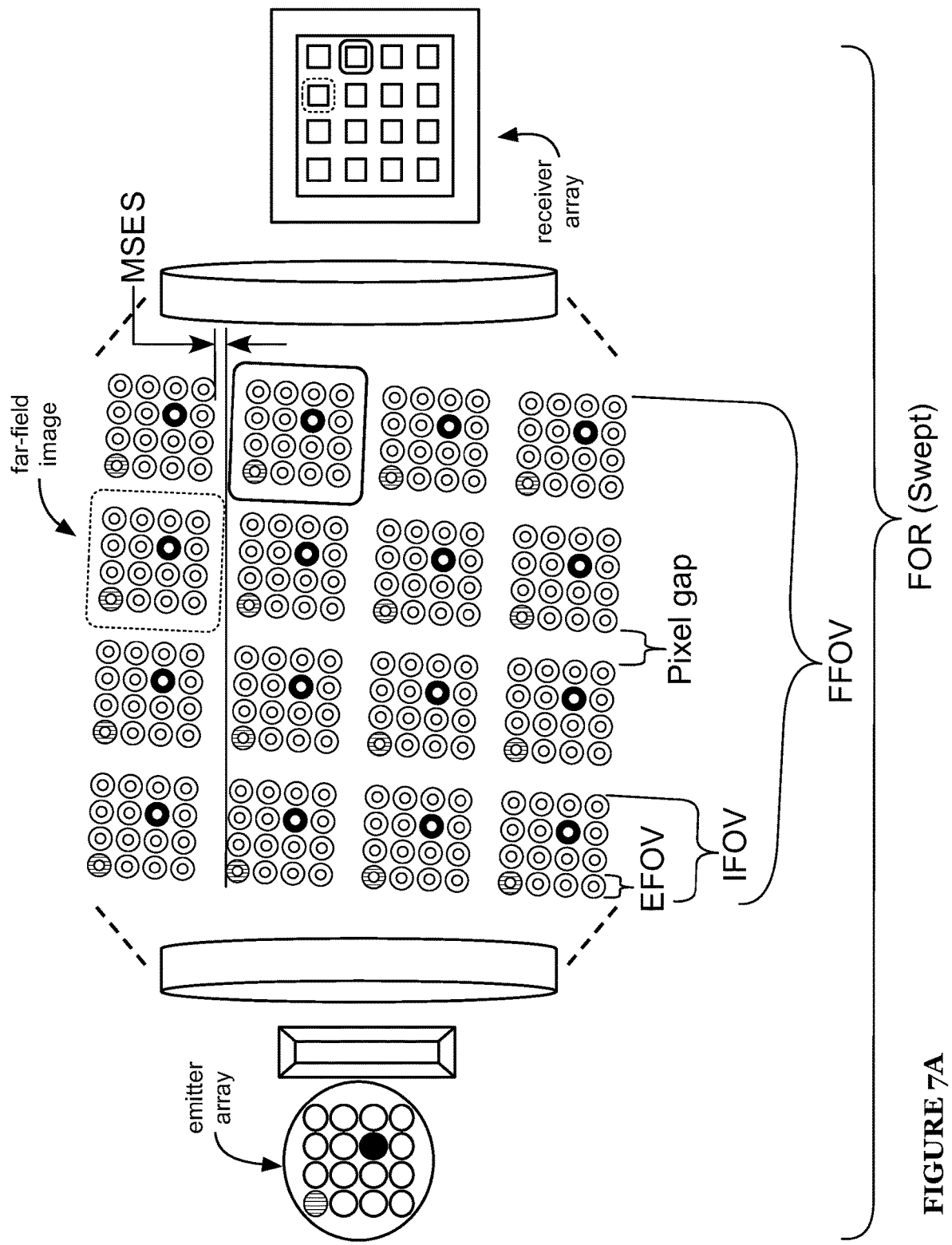
FIG. 7A is a representation of a variation of the first example of the lidar system.

The light beams and/or arrangement thereof (e.g., while propagating through the external environment, such as before reflection at one or more external locations 30) can be described by metrics, including various field of view (FOV) metrics (e.g., as shown in FIGS. 7A and/or 7B), preferably expressed as one or more angles and/or solid angles. The metrics can include metrics associated with a static beam director (and/or with a single instant in time for a beam director that is sweeping the beams), such as emitter FOV (EFOV, the FOV associated with a single light beam), instantaneous FOV (IFOV, the FOV associated with one pixel), full FOV (FFOV, the FOV associated with the entire array of light beams and/or receivers), sub-pixel gap, and/or pixel gap. The metrics can additionally or alternatively include metrics associated with a sweeping beam director (e.g., associated with the swept array of beams), such as field of regard (FOR, the entire field swept by the FFOV as the beam director sweeps the beams) and/or minimum single emitter separation (MSES, the largest gap between adjacent beam sweep regions). In examples in which the beams defined substantially parallel planar swept regions, the MSES corresponds to the largest spacing between adjacent swept regions.

The pixel and/or sub-pixel arrays (e.g., entering and/or exiting the beam director) are preferably aligned at an oblique angle to the beam director axis and/or to the sweep direction, which can enable superior resolution in a direction parallel the beam director axis and/or orthogonal to the sweep direction. The alignment angle is preferably only slightly oblique (e.g., within a threshold angle of 0 and/or 90°, such as 0.5, 1, 2, 3, 5, 7, 10, 15, 0.1-1, 1-3, 3-6, 6-10, or 10-20°, etc.). The alignment angle is preferably selected to minimize the MSES and/or to achieve a MSES less than a threshold value (e.g., less than 2, 1, 0.5, 0.2, 0.15, 0.1, 0.08, 0.05, 0.02, 0.01, 0.002-0.01, 0.01-0.05, 0.05-0.2, 0.2-1, or 1-5°). This MSES optimization can be constrained by one or more criteria, such as: a fixed or minimum FFOV dimension (e.g., vFFOV, the FFOV length parallel the beam director axis); a requirement that the beam director 200 direct each reflected beam to the appropriate region of the receive module 300 (e.g., accounting for active and inactive regions of the receivers 310), which may dictate metrics such as a maximum IFOV (e.g., which must fit entirely within the receiver active region) and/or a minimum pixel gap (e.g., which must be sufficiently large to accommodate the inactive regions of adjacent receivers); a fixed or constrained pixel and/or sub-pixel array arrangement; and/or any other suitable criteria (or can alternatively be unconstrained). In one example, the sub-pixel arrangement, pixel arrangement, and/or alignment angle are determined to optimize vFFOV and/or receiver sensitivity (e.g., wherein greater sensitivity can enable longer-range object detection) while achieving an MSES less than or equal to 0.1°, a pixel gap and sub-pixel gap both greater than 1.5 mrad, direction of each reflected beam to the appropriate region of the receive module 300, and with a fixed relative aperture (e.g., an f-number of f/1). Specific examples are shown in FIGS. 8A-8D.

However, the system 200 can additionally or alternatively include any other suitable beam directors with any suitable arrangement.

2.3 Receive Module

The receive module 300 preferably functions to receive light beams (e.g., the light beams reflected at external locations 30). The receive module 300 preferably includes a receiver 310 (more preferably, a plurality of receivers 310), and optionally includes receive module optics 320.

The number of receivers 310 is preferably equal to the number of pixels (e.g., the multiplicity of the beam splitter, the number of beams into which each emitted beam is split by the beam splitter, etc.). There is preferably a one-to-one correspondence between pixels and receivers. All beams of a single pixel (or the subset of such beams that are reflected from an external location 30 back to the lidar system 10) are preferably incident on the receiver 310 (e.g., on the active area of the receiver) associated with that pixel, and not on any other receivers 310.

As such, the receivers 310 are preferably arranged (e.g., defining a receiver array) based on the pattern of output beams created by the beam splitter 121 (e.g., arranged in a geometrically similar pattern). In a first example, in which the beam splitter 121 splits each incident beam into a lattice of output beams, the receivers 310 are arranged in a matching lattice (e.g., both the output beams and the receivers define square lattices, such as 4×4 square lattices), such as shown in FIG. 5A. In a second example, in which the beam splitter 121 splits each incident beam into a line of output beams, the receivers 310 are arranged in a matching line (e.g., both the output beams and the receivers define 16×1 linear arrays), such as shown in FIG. 5B.

However, the number of receivers 310 can alternatively be less than the number of pixels (e.g., one receiver 310 for every fixed number of pixels, such as every 2, 3, or 4 pixels; a single receiver 310; etc.), greater than the number of pixels (e.g., wherein each pixel corresponds to several receivers 310, such as 2, 3, or 4 receivers; one receiver 310 for every light beam; etc.), or any other suitable number of receivers 310, and/or the receivers 310 can be arranged in any other suitable manner.

Each receiver 310 preferably includes an optical transducer 311 and a data link 312, and can additionally or alternatively include receiver optics 313 and/or any other suitable receiver elements.

The optical transducer 311 preferably functions to generate an output signal (e.g., electrical signal, such as a current and/or voltage signal) in response to receiving the light beam(s). The optical transducer 311 is preferably a photodiode, such as an avalanche photodiode (APD), but can additionally or alternatively include any other suitable transducer elements. The optical transducer 311 (e.g., photodiode) preferably defines a small active area (e.g., 0.5, 1, 1.5, 2, 2.25, 2.5, 3, 5, 9, 15, 0.2-1, 1-2, 2-3, 3-6, 6-12, 12-25, 25-50, or 50-100 $mm^2$, which can result in improved sensitivity (e.g., due to lower capacitance of the element), but can alternatively have any suitable size. The optical transducer 311 can include a substantially square or circular active area (e.g., defining a width such as 0.2, 0.5, 1, 1.5, 2, 3, 5, 0.1-0.3, 0.3-1, 1-2, 2-4, or 4-10 mm), an elongated active area (e.g., defining a high aspect ratio region, such as a region with an aspect ratio of 2, 3, 5, 10, 20, 30, 1-4, 4-8, 8-16, 10-20, 20-40, etc.) such as a rectangular or elliptical active area, and/or any other suitable active area of any suitable shape and/or size.

The data link 312 preferably functions to couple (and/or translate) information from the optical transducer 311 to the processing module 400. In one embodiment, the data link 312 includes an analog-to-digital converter (ADC) that converts analog electrical signals (e.g., output by the optical transducer 311) into digital signals (e.g., electrical, optical, etc.), wherein the digital signals are preferably delivered to the processing module 400. However, the receive module 300 can additionally or alternatively include any other suitable data link elements.

The receive module optics 320 and/or receiver optics 313 preferably function to couple light (e.g., the reflected light beams) from the beam director 200 into the optical transducer 311. For example, all reflected beams can propagate from the beam director 200 through the receive module optics 320, wherein different beams (e.g., beams associated with different pixels) then propagate through the receiver optics 313 of different receivers. The receive module optics 320 and/or receiver optics 313 can include refractive elements, reflective elements, diffractive elements, and/or any other suitable optical elements. However, the receive module 300 can alternatively include no receive module optics 320 and/or receiver optics 313, and/or can additionally or alternatively include any other suitable elements in any suitable arrangement.

2.4 Processing Module

The processing module(s) 400 preferably function to: control other elements of the lidar system 10, such as the transmit module 100 (e.g., controlling optical emission and/or modulation) and/or beam director 200 (e.g., controlling the direction of the beam); receive data from other elements of the lidar system 10, such as the receive module 300 (e.g., receiving signals associated with light detection) and/or beam director 200 (e.g., receiving signals associated with the direction of the beam(s) and/or beam director 200); and/or process (e.g., interpret) the received data, such as to determine information about the external environment (e.g., positions of the external locations 30). The processing module 400 is preferably communicatively (e.g. electronically) coupled to the transmit module 100, beam director 200, receive module 300, and/or any other suitable elements of the system. The processing module 400 is preferably configured to implement the method 20 (e.g., by controlling other elements of the lidar system 10), but can additionally or alternatively implement any other suitable methods. The processing module 400 preferably includes one or more processors (e.g., CPU, GPU, microprocessor, FPGA, ASIC, etc.) and/or storage units (e.g., Flash, RAM, magnetic disk drive, etc.), but can additionally or alternatively include any other suitable elements.

2.5 Specific Examples

Figure 7B:
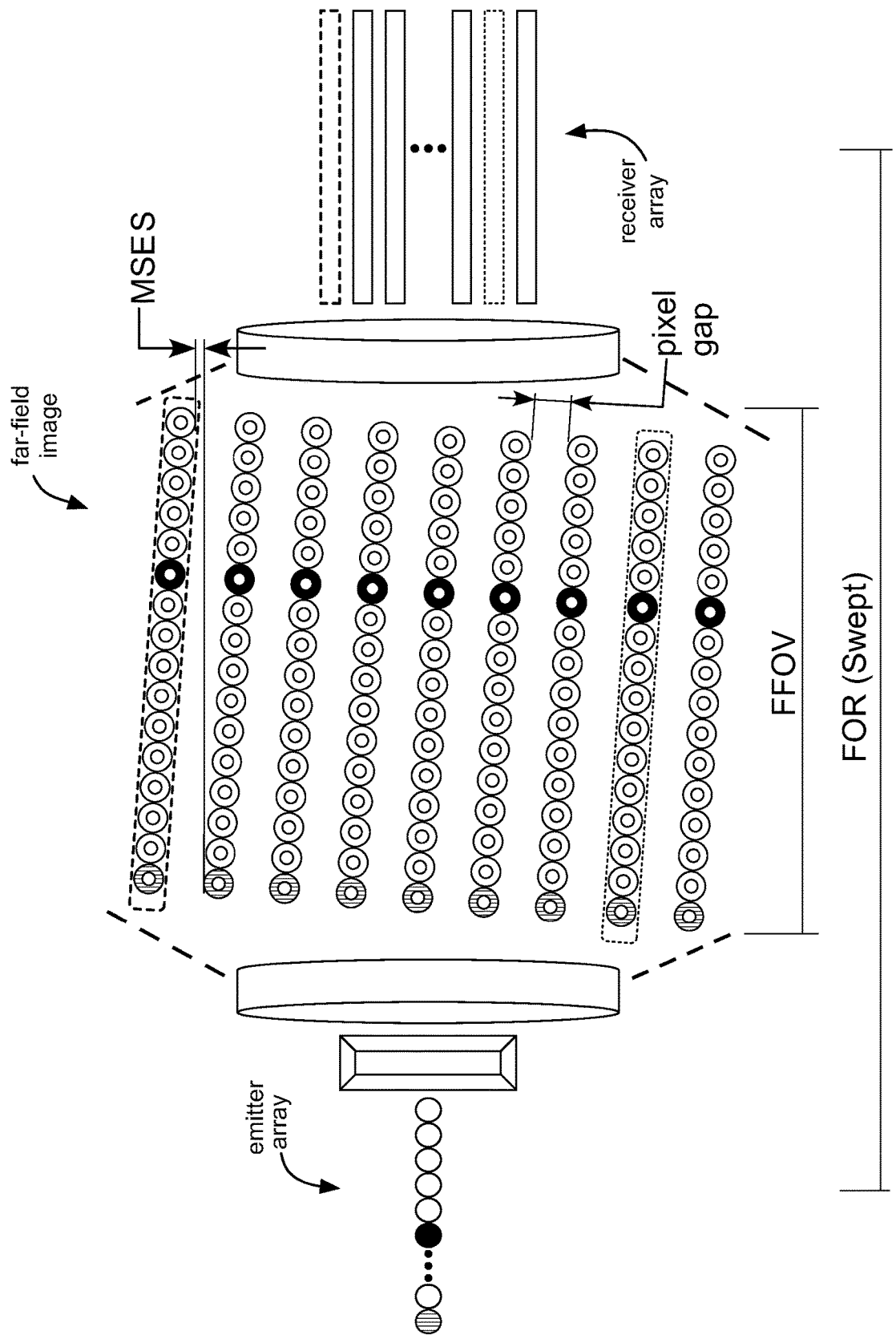
FIG. 7B is a representation of a variation of the second example of the lidar system.

In one example, the lidar system 10 defines a 4×4 square lattice of pixels (and includes a corresponding 4×4 square lattice of optical transducers 311), wherein each pixel is defined by a 4×4 square lattice of sub-pixels (e.g., as shown in FIG. 7). In this example, the arrangement of pixels and/or sub-pixels relative to each other and/or to the beam director 200 is optimized (e.g., as described above).

Figure 8A:
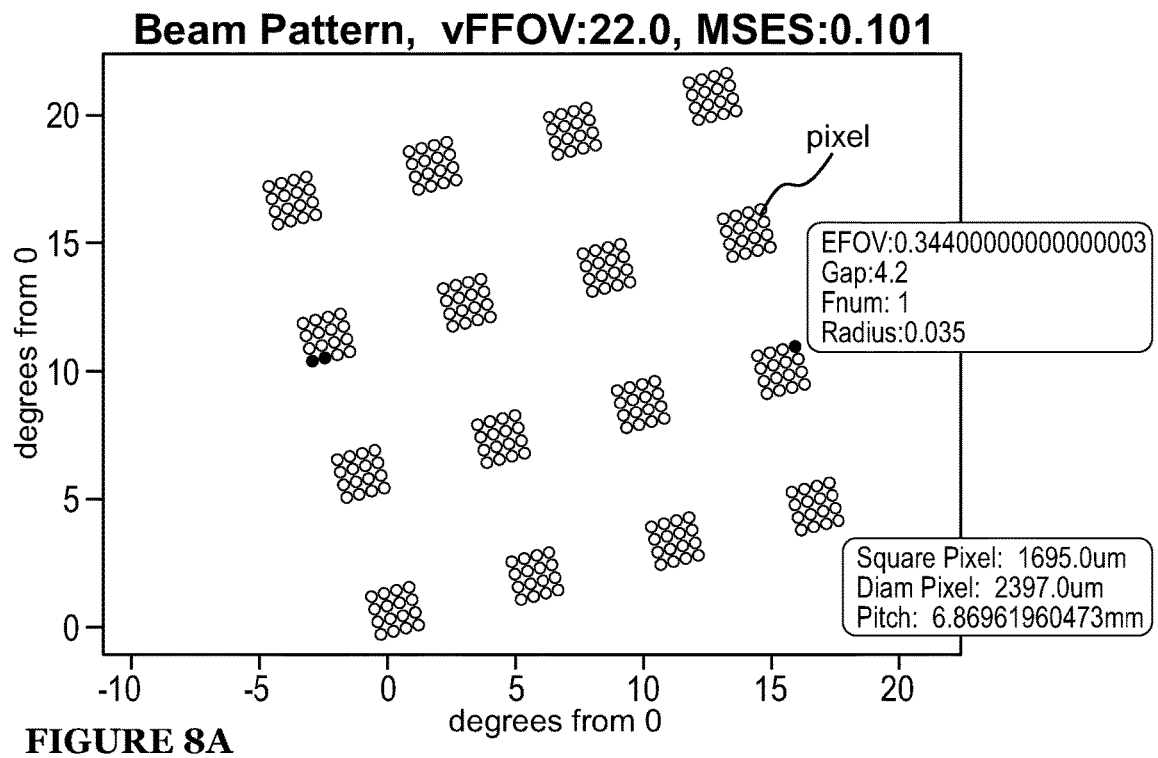
FIGS. 8A-8D are representations of far field images of a beam patterns produced by various specific examples of the lidar system.

In a first specific example, in which each optical transducer 311 includes a 3 mm wide active region and the optical assembly focal length is 70 mm, the beam pattern achieves a vFFOV of 22°, a MSES of 0.101°, and a sensitivity enabling an object detection range of up to 258 m (e.g., as shown in FIG. 8A).

Figure 8B:
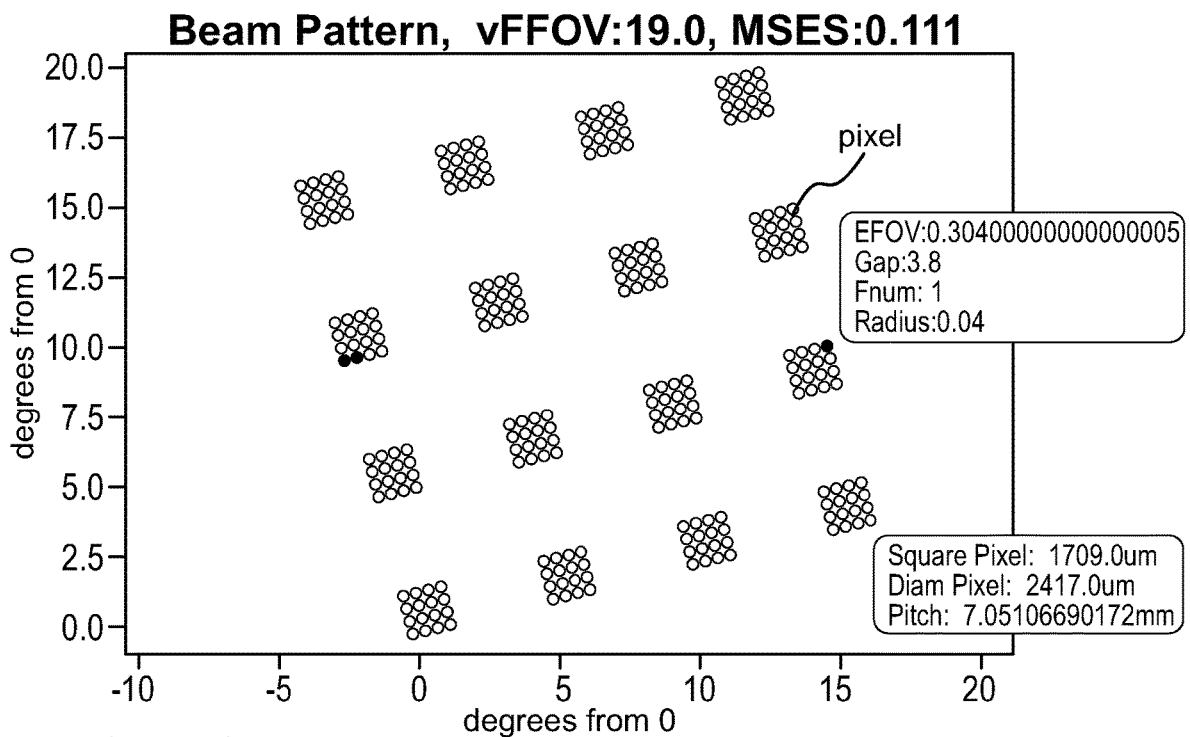

In a second specific example, in which each optical transducer 311 includes a 3 mm wide active region and the optical assembly focal length is 80 mm, the beam pattern achieves a vFFOV of 19° and a MSES of 0.111°, and a sensitivity enabling an object detection range of up to 295 m (e.g., as shown in FIG. 8B).

Figure 8C:
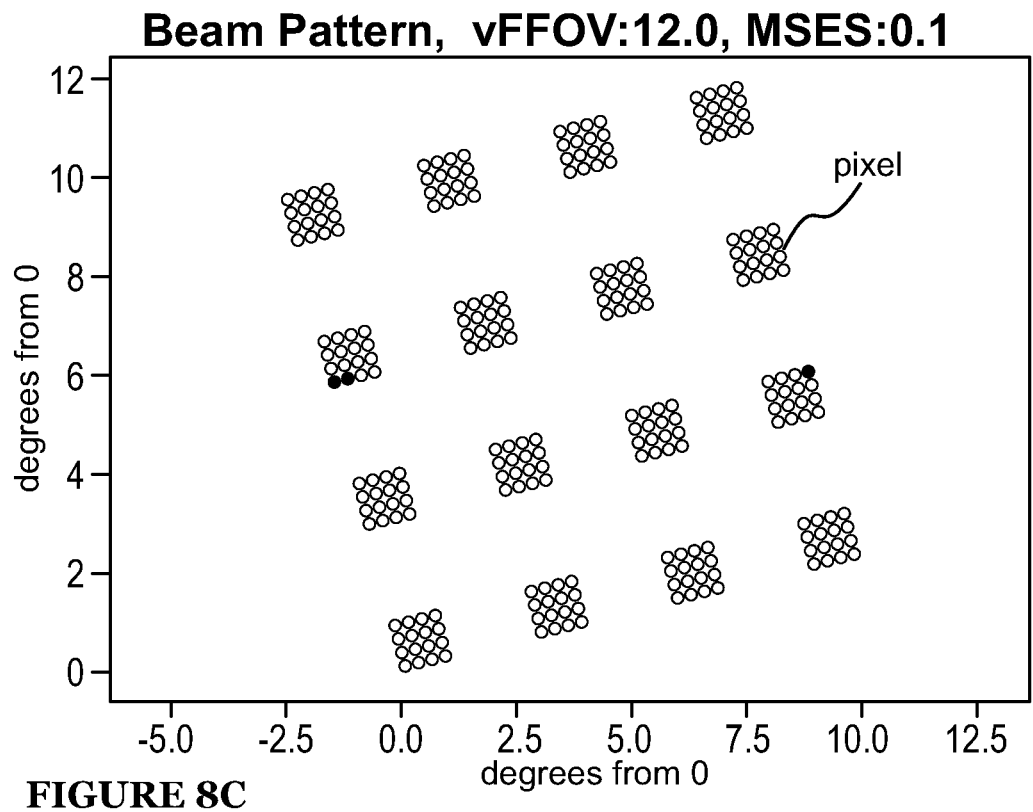

In a third specific example, in which each optical transducer 311 includes a 1.5 mm wide active region and the optical assembly focal length is 70 mm, the beam pattern achieves a vFFOV of 12°, a MSES of 0.1°, and a sensitivity enabling an object detection range of up to 372 m (e.g., as shown in FIG. 8C).

Figure 8D:
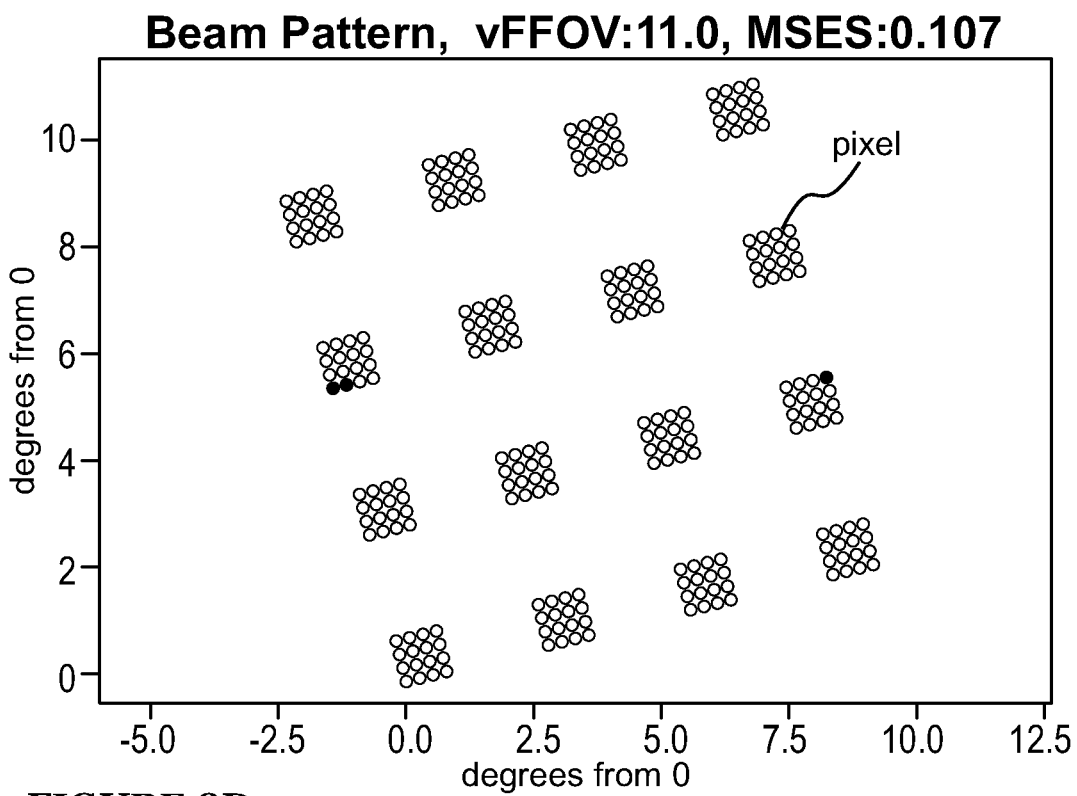

In a fourth specific example, in which each optical transducer 311 includes a 1.5 mm wide active region and the optical assembly focal length is 80 mm, the beam pattern achieves a vFFOV of 11°, a MSES of 0.107°, and a sensitivity enabling an object detection range of up to 425 m (e.g., as shown in FIG. 8D).

However, the lidar system 10 can additionally or alternatively include any other suitable elements in any suitable arrangement.

3. Method

Emitting light beams preferably functions to emit the beams into the external environment (e.g., where they can be reflected at one or more external locations 30). The light beams are preferably emitted by the transmit module 100 (e.g., emitted by the transmitters 110 and split by the beam splitter 121), but can additionally or alternatively be emitted by any other suitable elements.

The light beams are preferably emitted in a manner that enables the use of one or more multiplexing techniques (e.g., enables differentiation between received light beams, such as light beams received at a single receiver 110). For example, different emitters can emit light beams encoding different signals (e.g., thereby enabling use of CDMA, such as asynchronous CDMA) and/or can emit light beams at different times (e.g., thereby enabling use of TDMA). The processing module 400 preferably controls the transmit module 100 to emit the light beams accordingly (e.g., controls each controller 112 to modulate the light beams, thereby encoding the appropriate signals).

In embodiments in which the light beams are separated by more than a threshold amount (e.g., as described above), such as wherein both the pixel gap and sub-pixel gap are greater than 1.5 mrad, the intensity (e.g., maximum intensity) of each light beam is preferably lower than or equal to the limit prescribed by regulatory standards (e.g., the laser can be compliant with IEC-60825, IEC-62471, etc.), but can alternatively be higher. The signal power can be within regulatory limits (e.g., less than 2 mW, less than 1 mW, etc.), but can alternatively be higher or lower (e.g., less than any other suitable threshold power, such as 5 W, 2 W, 1 W, 500 mW, 200 mW, 100 mW, 50 mW, 20 mW, 10 mW, 5 mW, 0.5 mW, 0.2 mW, or 0.1 mW, etc.). In other embodiments (e.g., in which some light beams are not separated by at least threshold amount), a sum of intensities of multiple beams (e.g., of a group of beams all within the threshold amount of separation) can be lower than or equal to (or alternatively, greater than) the limit. The emitters are preferably controlled to achieve such light beam intensities. For example, if each sub-pixel is separated by at least 1.5 mrad, each emitter beam is split into 16 output beams, and optical losses in the system cause each output beam to have an intensity (e.g., when exiting the system) of approximately 5% of the original beam from the emitter, then the emitter can be controlled to emit a beam with an intensity of approximately 20 times the applicable safety and/or regulatory limit (e.g., for a 1 mW limit, emit a beam of approximately 20 mW). However, the light beams can additionally or alternatively have any other suitable intensities, and/or can be emitted in any other suitable manner.

Receiving the reflected light beams preferably functions to receive light beams that have been reflected at one or more external locations 30 (e.g., light beams indicative of object positions within the external environment). Multiple light beams from different emitters are preferably received at each receiver (e.g., all sub-pixels of a given pixel are preferably received at the receiver associated with that pixel). More than one light beam from a single emitter (e.g., corresponding to beams from different pixels) is preferably not received at a single receiver (e.g., each receiver preferably only receives reflected light beams emitted by the pixel associated with that receiver). Alternatively, light beams from multiple pixels can be received at a single receiver (e.g., wherein signals associated with light beams from the pixels not associated with that receiver can be detected, filtered out, and/or otherwise processed).

In response to light beam receipt, the receive module preferably sends data associated with the received light beams to the processing module. In one example, each optical transducer (e.g., photodiode, such as an APD) generates a signal (e.g., electrical signal), which is transmitted to a data link (e.g., ADC), wherein the data link couples the signal to the processing module (e.g., transforms the signal into a digital signal, and delivers the digital signal to an input of the processing module). However, the light beams can additionally or alternatively be received in any other suitable manner.

Analyzing the data associated with the received light beams preferably functions to determine information (e.g., position, optical characteristics, velocity, etc.) about the objects that reflected the light beams (e.g., the objects at the external locations 30). Analyzing the data preferably includes differentiating between data associated with different sub-pixels using a multiplexing technique (e.g., the technique enabled by aspects of the light beam emission, such as CDMA and/or TDMA). Analyzing the data preferably includes determining a delay time associated with each received light beam (e.g., wherein the delay time represents the round-trip propagation time of the light beam, which can be used to determine the distance to the external location 30 at which it was reflected, based on the speed of light).

The method 20 can optionally include repeating one or more of the elements described above. One embodiment includes emitting light beams and/or receiving reflected light beams (e.g., continuously performing both, preferably substantially concurrently), preferably while repeatedly analyzing the data associated with the received light beams and/or changing the beam directions (e.g., operating the beam director as described above, such as to sweep the beams through the environment).

In some embodiments, the method 20 can include elements (e.g., associated with differentiating and/or enabling differentiation between data associated with different sub-pixels, such as using CDMA) such as described in U.S. Provisional Application Ser. No. 62/749,795, filed 24 Oct. 2018 and titled "Lidar System and Method of Operation", which is hereby incorporated in its entirety by this reference. However, the method 20 can additionally or alternatively include any other suitable elements performed in any suitable manner.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGS. illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:
1. A method for environment mapping, comprising:
at a lidar emitter, emitting a set of optical beams toward a beam director;
at the beam director, directing each optical beam of the set outward of a sweep axis, wherein:
the set of optical beams intersect a reference cylindrical surface at a set of points, wherein each optical beam of the set of optical beams intersects the reference cylindrical surface at a different point of the set of points;
the reference cylindrical surface is coaxial with the sweep axis; and
a plurality of points of the set of points define a linear array along an array direction, wherein the plurality of points are substantially arrayed along the array direction, wherein a reference line parallel to the sweep axis intersects the array direction at a substantially oblique angle;
at the beam director, while directing each optical beam of the set outward of the sweep axis, sweeping each optical beam of the set about the sweep axis, wherein each optical beam of the set sweeps out a respective region of a respective right conical surface coaxial with the sweep axis;
at a lidar receiver, receiving a plurality of reflected optical beams, each reflected optical beam originating from a reflection, off a respective object, of a different optical beam of the set of optical beams; and
based on the plurality of reflected optical beams, determining, for each reflected optical beam of the plurality, a relative location of the respective object.
2. The method of claim 1, wherein a second plurality of points of the set of points are substantially arrayed along a second array direction perpendicular to the array direction.
3. The method of claim 2, wherein the set of points substantially defines a rectangular array.
4. The method of claim 1, wherein sweeping each optical beam of the set about the sweep axis comprises sweeping each optical beam about the sweep axis by a full rotation.
5. The method of claim 1, wherein:
the set of points substantially defines a hexagonal array, the hexagonal array defining the array direction, a second array direction, and a third array direction;
the array direction, the second array direction, and the third array direction are coplanar and each intersect at 60° angles;

the reference line intersects the second array direction at a second substantially oblique angle; and the reference line intersects the third array direction at a third substantially oblique angle.

6. The method of claim 1, wherein each optical beam of the set of optical beams is emitted substantially concurrently.

7. The method of claim 6, wherein each optical beam of the set of optical beams is emitted substantially continuously, wherein the lidar receiver receives the plurality of reflected optical beams while the lidar emitter emits the set of optical beams.

8. The method of claim 1, wherein the beam director directs each reflected optical beam of the plurality to the lidar receiver.

* * * * *